(12) United States Patent
Isenhour et al.

(10) Patent No.: US 9,645,339 B2
(45) Date of Patent: May 9, 2017

(54) OPTICAL PORT HAVING MINIMALIST FOOTPRINT

(71) Applicant: Corning Optical Communications LLC, Hickory, NC (US)

(72) Inventors: Micah Colen Isenhour, Lincolnton, NC (US); Dennis Michael Knecht, Hickory, NC (US); James Phillip Luther, Hickory, NC (US)

(73) Assignee: CORNING OPTICAL COMMUNICATIONS LLC, Hickory, NC (US)

(*) Notice: Subject to any disclaimer, the term of this patent is extended or adjusted under 35 U.S.C. 154(b) by 0 days.

(21) Appl. No.: 15/206,712

(22) Filed: Jul. 11, 2016

(65) Prior Publication Data

US 2016/0320578 A1 Nov. 3, 2016

Related U.S. Application Data

(62) Division of application No. 13/832,128, filed on Mar. 15, 2013, now Pat. No. 9,389,369.

(Continued)

(51) Int. Cl.
G02B 6/42 (2006.01)
G02B 6/38 (2006.01)
G02B 6/32 (2006.01)

(52) U.S. Cl.
CPC ......... *G02B 6/4292* (2013.01); *G02B 6/3821* (2013.01); *G02B 6/3829* (2013.01);

(Continued)

(58) Field of Classification Search
CPC .. G02B 6/4292; G02B 6/3821; G02B 6/3886; G02B 6/4228; G02B 6/428

(Continued)

(56) References Cited

U.S. PATENT DOCUMENTS 6,146,025 A * 11/2000 Abbink ............... G02B 6/4238
385/88
6,863,448 B2 3/2005 Chiu et al.
(Continued)

FOREIGN PATENT DOCUMENTS

JP 2000275464 A 10/2000
WO 2012078697 A1 6/2012

OTHER PUBLICATIONS

Patent Cooperation Treaty, International Search Report for PCT/US2013/074852, mail date Mar. 27, 2014, 3 pages.

(Continued)

*Primary Examiner* — Jerry Blevins

(57) ABSTRACT

Disclosed are optical ports and devices having a minimalist footprint. Specifically, the optical ports and devices have a footprint where the optical elements are exposed at a frame of the device. Additionally, a frame of the device provides a portion of the mating surface for engaging a complimentary optical plug during mating with the optical port on the device. This minimalist footprint advantageously allows for a smaller portion of the optical port to be exposed to the environment and subject to damage and/or wear. Further, the optical port provides a clean and sleek optical port on the device with a relatively small surface that may be cleaned or wiped by the user as necessary.

25 Claims, 17 Drawing Sheets

Related U.S. Application Data

(60) Provisional application No. 61/736,629, filed on Dec. 13, 2012.

(52) U.S. Cl.
CPC ......... G02B 6/3885 (2013.01); G02B 6/3886 (2013.01); G02B 6/4204 (2013.01); G02B 6/428 (2013.01); G02B 6/4228 (2013.01); G02B 6/4249 (2013.01); G02B 6/32 (2013.01)

(58) Field of Classification Search
USPC .................................................. 385/77, 90
See application file for complete search history.

(56) References Cited

U.S. PATENT DOCUMENTS

| | | |
|---|---|---|
| 8,651,749 B2 | 2/2014 | Dainese, Jr. et al. |
| 8,727,637 B2 | 5/2014 | Isenhour et al. |
| 2004/0029437 A1 | 2/2004 | Caveney |
| 2008/0027280 A1 | 1/2008 | Fengler et al. |
| 2008/0127410 A1 | 6/2008 | Schmitt et al. |
| 2011/0229093 A1 | 9/2011 | McColloch |
| 2012/0082417 A1 | 4/2012 | Stanley et al. |
| 2012/0148195 A1 | 6/2012 | Umeno |
| 2012/0178271 A1 | 7/2012 | Rohrbach et al. |
| 2012/0183261 A1 | 7/2012 | Schwandt et al. |
| 2013/0183000 A1 | 7/2013 | Erdman et al. |
| 2015/0023671 A1 | 1/2015 | Bradley et al. |

OTHER PUBLICATIONS

Patent Cooperation Treaty, International Search Report for PCT/US2013/074858, mail date Mar. 27, 2014, 3 pages.

Chinese First Office Action and Search Report CN201380069011.9 Dated Apr. 29, 2016.

* cited by examiner

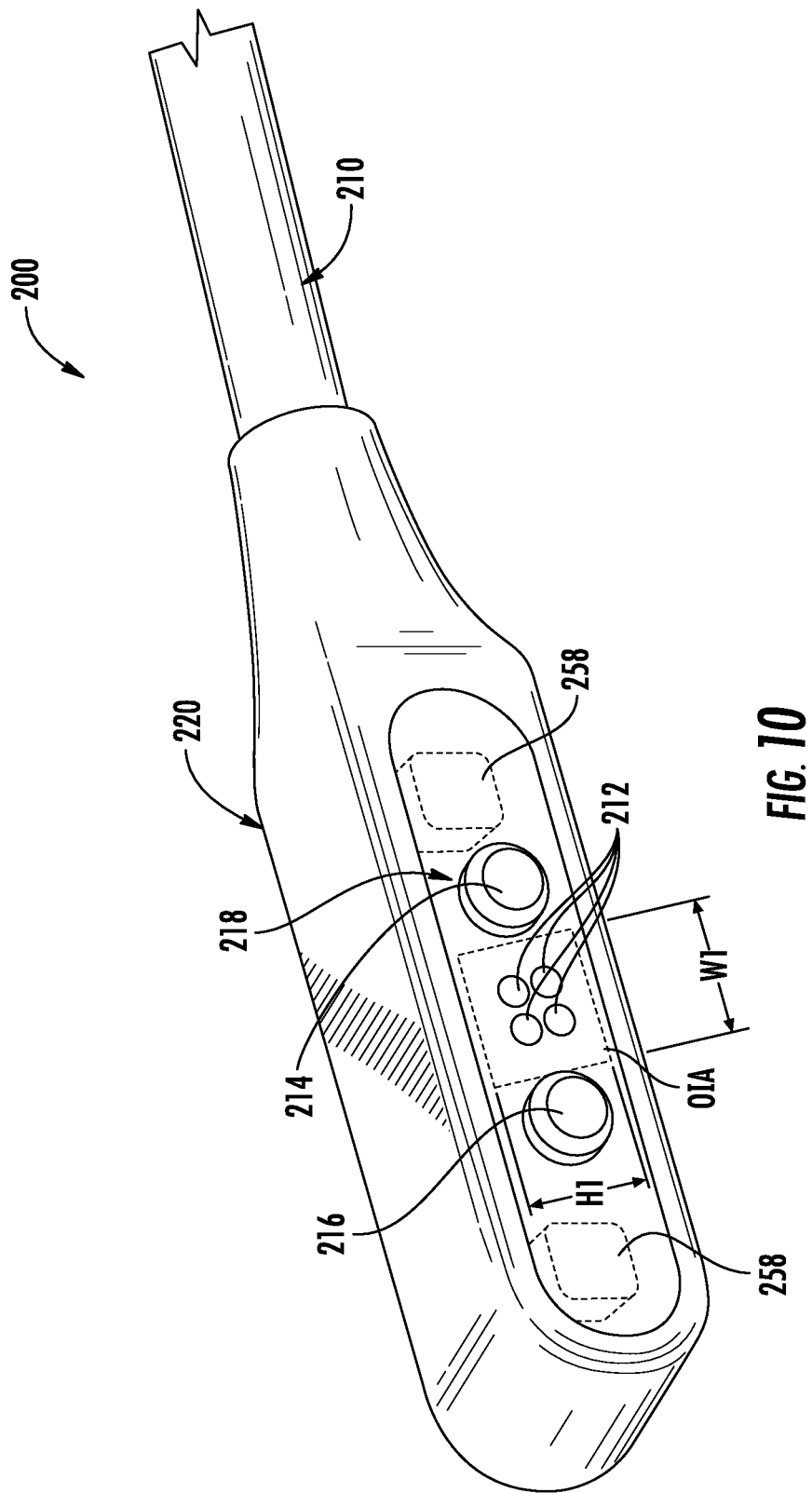

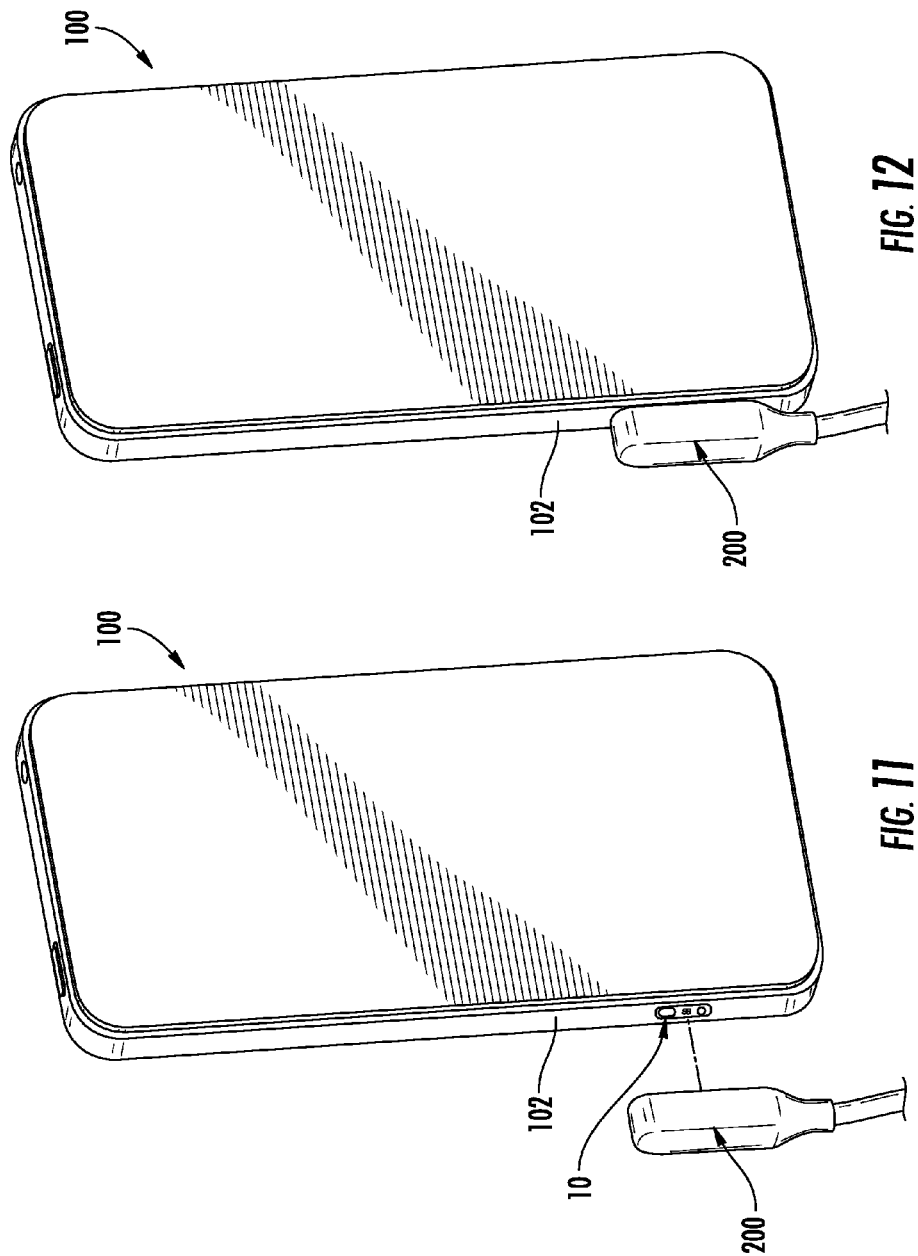

OPTICAL PORT HAVING MINIMALIST FOOTPRINT

PRIORITY

This application is a divisional of U.S. patent application Ser. No. 13/832,128, filed Mar. 15, 2013, and claims the benefit of priority under 35 U.S.C. §119 of U.S. Provisional Application No. 61/736,629, filed on Dec. 13, 2012, the content of which is relied upon and incorporated herein by reference in its entirety.

FIELD

The disclosure relates generally to optical ports and devices that incorporate the optical port. Specifically, the optical ports and devices disclosed herein provide a footprint where the optical element is exposed at a frame of the device for creating a minimalist footprint for the optical port on the device.

BACKGROUND

Optical fibers have displaced copper-based connectivity in much of the traditional long-haul and metro telecommunication networks for numerous reasons such as large bandwidth capacity, dielectric characteristics and the like. As consumers require more bandwidth for consumer electronic devices such as smart phones, laptops, tablets and the like optical fibers and optical ports for optical signal transmission are being considered for replacing the conventional copper-based connectivity for these applications. However, there are significant challenges for providing optical connectivity in consumer devices compared with copper-based connectivity. By way of example, devices such as smart phones, laptops and tablets are exposed to rough handling and harsh environments and the consumer will expect optical connectivity to handle these demanding conditions. Further, these types of devices will require a large number of mating/unmating cycles during their lifetime.

Thus, there is an unresolved need for optical ports in consumer devices and other devices that can accommodate the harsh treatment and user environment along with the large number of mating/unmating cycles expected during the lifetime of the device.

SUMMARY

The disclosure is directed to an optical port for a device having a mounting body with at least one mounting surface for securing the optical port and one or more optical elements having one or more respective front surfaces that extends beyond the mounting surface of the mounting body. The optical port may include a minimalist footprint that allows a smaller portion of the optical port to be exposed to the environment compared with conventional optical port designs, thereby reducing the likelihood of damage and/or wear experience during a large number of mating/unmating cycles. The optical element(s) may be integrally formed with the mounting body or discrete lenses that are secured to the mounting body.

The disclosure is also directed to a device having an optical port having a frame with one or more optical element openings, an optical port having a mounting body, and one or more optical elements for communicating an optical signal. The mounting body is disposed inside the frame so that one or more optical elements is exposed at the one or more optical element openings of the frame, thereby providing a device with a minimalist optical port footprint so that a complimentary mating optical plug engages a portion of the frame during mating. The optical port may have an optical interface area where 80% or more of the optical interface area is provided by the frame of the device. Additionally, the optical element(s) may be integrally formed with the mounting body or discrete lenses that are secured to the mounting body.

The disclosure is also directed to an optical port for a device having a mounting body with at least one mounting surface for securing the optical port along with a first pocket and a second pocket. The one or more optical elements include one or more respective front surfaces that extend beyond the mounting surface. The optical port also includes one or more active devices attached to the circuit board that is attached to the mounting body, where the one or more active devices are aligned with the one or more optical elements. A first magnet and a second magnet are attached to the mounting body and the first pocket and the second pocket of the mounting body are disposed on opposites sides of the one or more optical elements with a first alignment feature disposed in the first pocket and a second alignment feature disposed in the second pocket. The optical port may have an optical interface area where 80% or more of the optical interface area is provided by the frame of the device. Additionally, the optical element(s) may be integrally formed with the mounting body or discrete lenses that are secured to the mounting body.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 10 is a perspective view showing the mating portion of an explanatory complimentary plug for mating with the optical port on the device of FIG. 1;

FIGS. 11 and 12 are perspective views showing the alignment and mating of the plug of FIG. 10 with the optical port on the device of FIG. 1;

DETAILED DESCRIPTION

Figure 1:
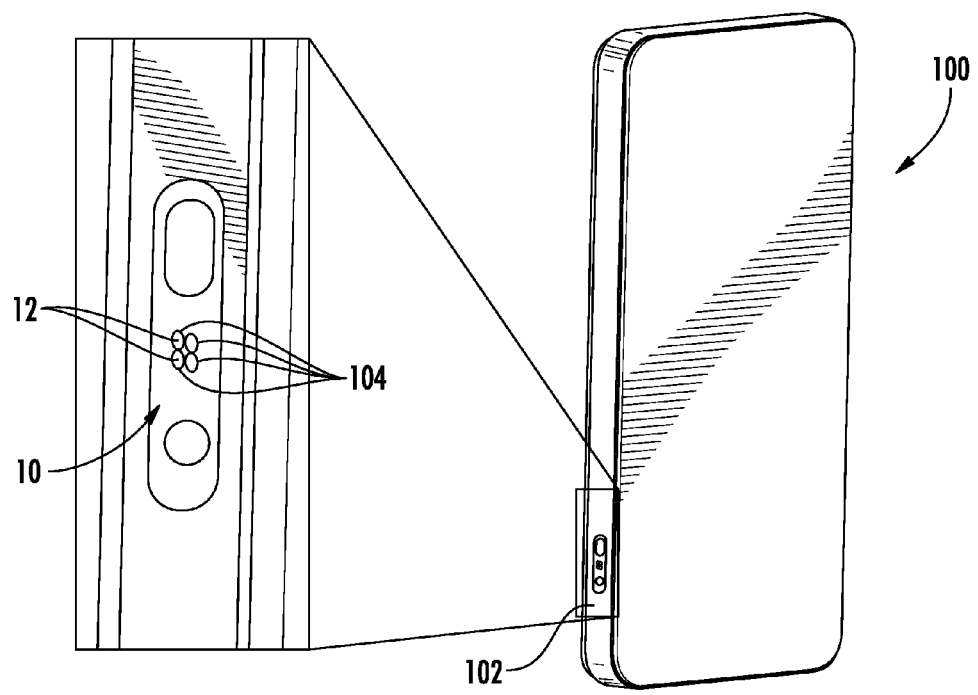
FIG. 1 is a perspective view of a device having an optical port according to the concepts disclosed herein.

Reference is now made in detail to the present preferred embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

Disclosed are optical ports and devices that incorporate the optical port therein. Specifically, the optical ports and devices disclosed herein provide a protected and robust footprint where the optical element is exposed at a frame of the device for creating a minimalist footprint for the portion of the optical port exposed on the device. Thus, a frame of the device provides a portion of the mating surface for engaging a complimentary optical plug during mating with the optical port on the device. This minimalist footprint advantageously allows for a smaller portion of the optical port to be exposed to the environment and subject to damage and/or wear. Further, the optical port provides a clean and sleek optical port on the device with a relatively small surface that may be cleaned or wiped by the user as necessary. Although, the application shows the optical port secured at an edge of a device it can have any suitable location or arrangement in the device. For instance, the optical port may be located on a large surface such as the bottom of a tablet or a laptop. Further, the optical port can have other alignment and/or retention features than the explanatory features that are discussed herein. Methods for making the optical port and/or device are also disclosed. The optical ports described herein are advantageous since they provide a robust and low-cost solution that addresses the challenges for providing optical ports in consumer devices and other devices.

FIG. 1 is a perspective view of a representative device 100 having an optical port 10 as shown in the detail window according to the concepts disclosed herein. Device 100 may be a smart phone, a tablet, a personnel device assistant (PDA), a data storage device, a laptop or desktop computer, a television, a monitor, or any other suitable device that includes the optical port 10. Device 100 includes a frame 102 having one or more optical element openings 104 exposed at the frame 102 for creating a minimalist optical port footprint used for optical connectivity. As used herein, "minimalist optical port footprint" or "minimalist footprint" means that the optical elements of the optical port are exposed at the frame of the device and closely surrounded by the frame so that the frame provides a portion of the mating surface for engaging a complimentary optical plug during mating with the optical port on the device. Thus, there is only a small footprint of the optical port exposed to the environment to protect the optical port and inhibit damage, the optical elements may be cleaned as necessary by the user and the optical port provides a clean and sleek look for the device. In this embodiment, each of the individual optical elements 12 of optical port 10 are exposed at individual optical element openings 104 with portions of the frame 102 disposed between the individual optical elements 12. Further, the one or more optical elements 12 of the optical port 10 may be a portion of the mounting body or be configured as discrete lenses attached to the mounting body with a portion of the mounting body exposed at the individual optical element openings as discussed in more detail below. As used herein, "frame" may be a sidewall, panel or faceplate of the device and the frame may include one or more pieces/components as desired for the given device.

Other components of optical port 10 may also be optionally exposed at the frame 102 of device 100 as desired. By way of example, one or more alignment features may be exposed at one or more openings on the frame of the device if desired such as shown in optical port 10. Stated another way, the optical port further includes one or more alignment features and the frame further including one or more alignment feature openings for receiving the one or more alignment features for exposing the alignment features to the outer surface of the device.

Figure 2:
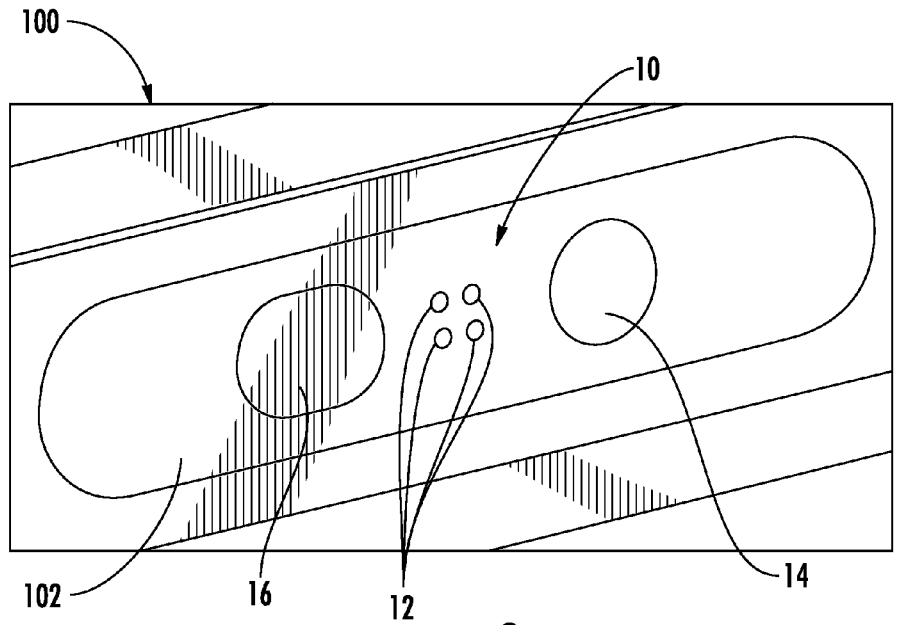
FIG. 2 is a detailed perspective view of the optical port of FIG. 1 showing the optical elements exposed at the frame of the device.
Figure 3:
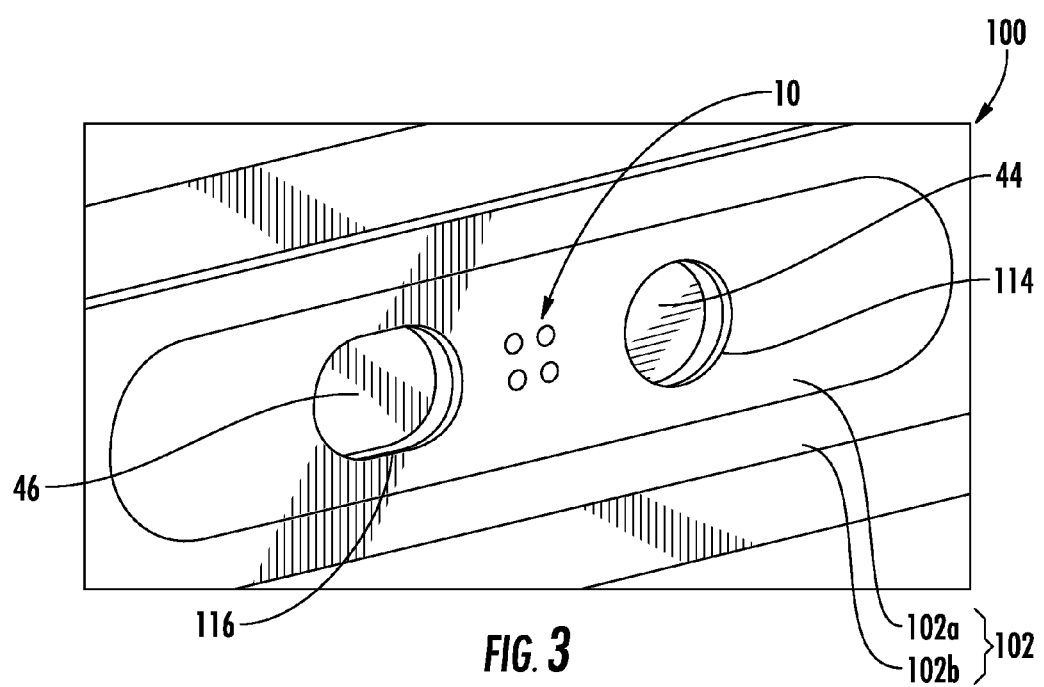
FIG. 3 is a detailed perspective view of the optical port of FIG. 1 showing alignment features being depressed as if a complementary plug is attached to the optical port.

FIG. 2 is a detailed perspective view of optical port 10 and FIG. 3 is a detailed perspective view of the optical port 10 showing alignment features 14, 16 being depressed as if a complementary plug (FIG. 10) is attached to the optical port 10. As best shown in FIG. 3, alignment features 14, 16 are exposed at the frame 102 and may translate during mating with a complimentary plug. In other words, frame 102 further includes one or more alignment feature openings 114, 116 for receiving and exposing the one or more alignment features 14, 16 of optical plug 10. The alignment features translate within respective bores of the optical port and the bores provide alignment with the complimentary plug while the alignment features are used for keeping the bores free of debris and providing a sleek look for the optical port. In other words, the alignment features 14, 16 are exposed at the frame 102 and may translate rearward within the bores when the respective alignment features such as protruding pins of a complimentary optical plug (FIG. 10) are mated to the optical port as represented in FIG. 3. As shown, the alignment features 14,16 are generally flush with a front surface of the optical port and are able to translate rearward into the respective bores during mating.

In other words, the alignment features of the optical port interface with the alignment features of the optical plug thereby providing alignment between the optical elements of the optical port and the optical plug for optical signal transmission therebetween. For instance, the respective alignment features may provide alignment of optical element centerlines between the optical port and complimentary plug to within 30 microns or less, but other suitable values for optical element centerline tolerances are possible so long as the insertion loss is acceptable for the application. Additionally, optical port 10 may include one or more suitable retention features for maintaining connection between the port and the plug.

Figure 4:
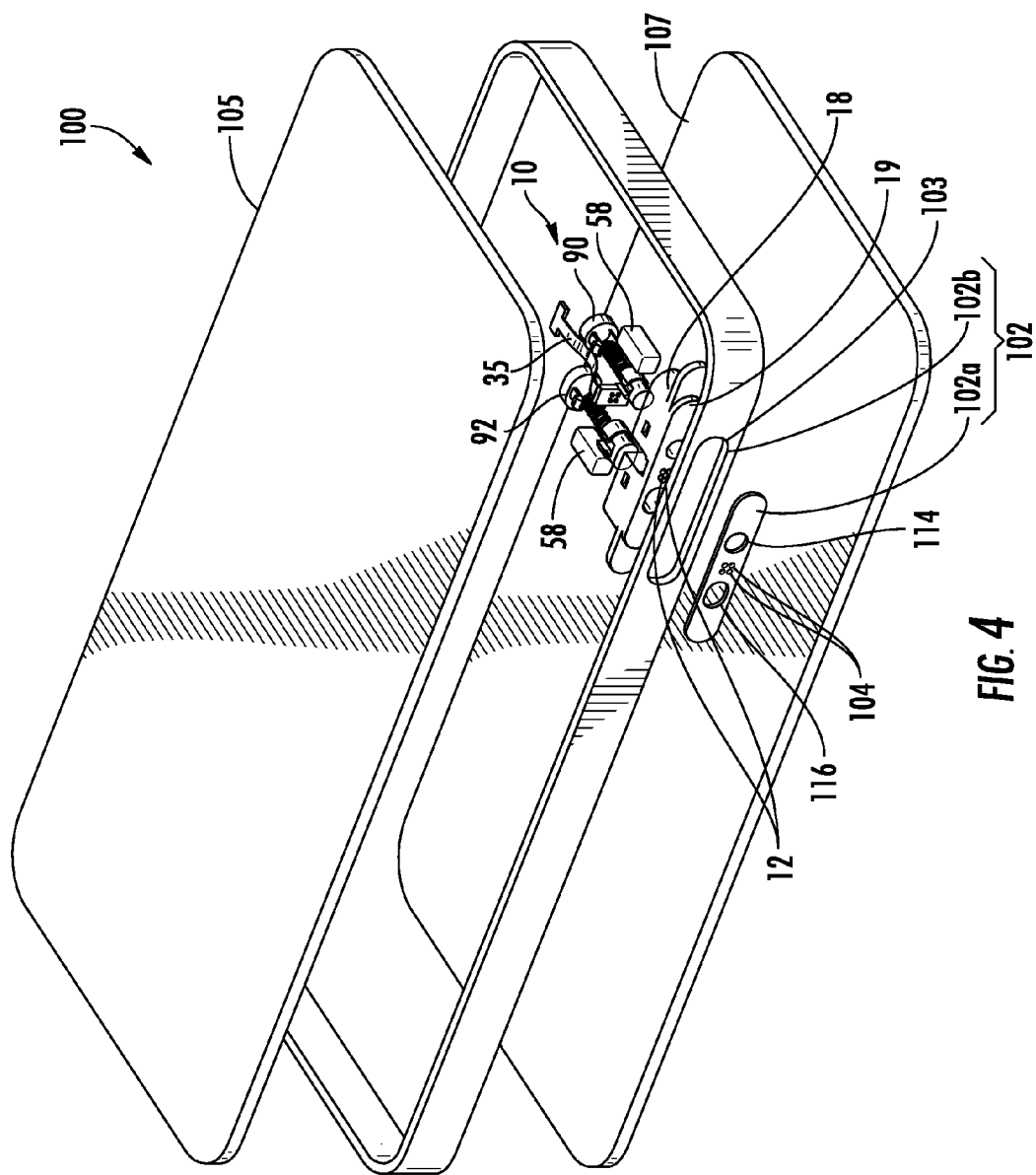
FIG. 4 is a partial exploded perspective view of the device of FIG. 1 showing the optical port in detail.

FIG. 4 is a partial exploded perspective view of the device of 100 showing the optical port 10 disposed inside the device. For the purposes of simplicity and clarity to describe the concepts disclosed herein, other structure inside the device 100 besides optical port 10 has been removed and the structure of the device is represented as primitive geometry. In this particular representation, device 100 has a two-piece perimeter frame 102 disposed between a top plate 105 and a bottom plate 107. The top plate 105 may be a glass surface such as Corning® Gorilla® Glass available from Corning, Incorporated or the like for providing a display and/or user interface and the bottom plate 107 may be a metal or plastic surface or the like for providing a rigid back surface for protection. Frame 102 includes a frame faceplate 102a that fits within an opening 103 on a frame perimeter 102a; however, the concepts of the optical port may be used with other suitable device/frame configurations as desired. By way of example, the bottom plate and perimeter frame may be incorporated as a single-piece with a glass surface for the top plate. Other embodiments may not use a frame faceplate, panel or the like, but instead have the optical element openings 104 formed in a single-piece of the frame. However, using a frame faceplate 102a may be desirable since it may aid in locating and/or securing the optical port 10 relative to the frame 102.

Figure 5:
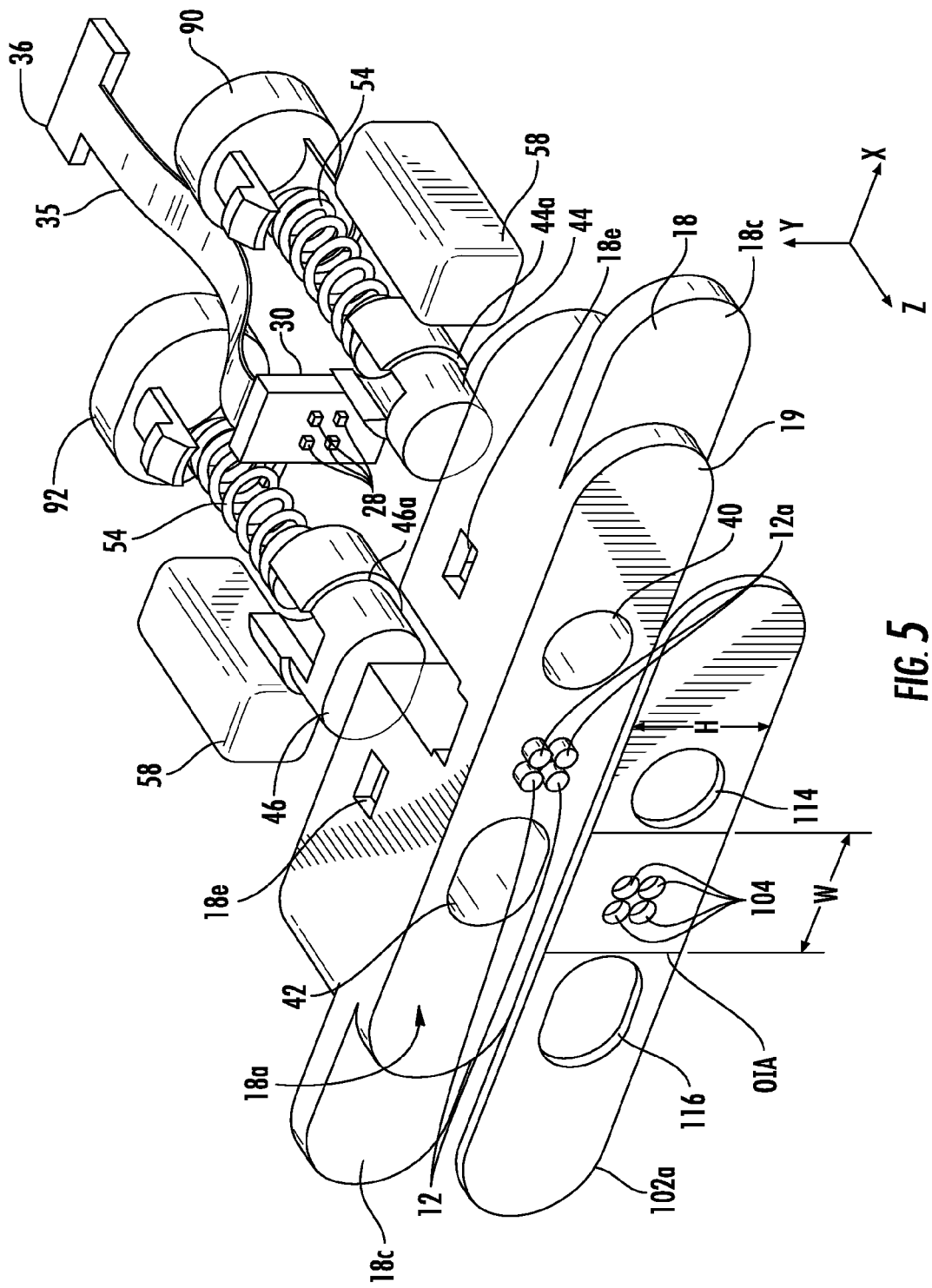
FIG. 5 is a front exploded view of the optical port of FIG. 4.

As best shown in FIG. 5, optical port 10 includes a mounting body 18 having at least one mounting surface 19 for securing the optical port 10 to the device 100 along with one or more optical elements 12 having one or more respective front surfaces 12a that extends beyond the mounting surface. Consequently, the optical port 10 provides a minimalist footprint for optical connection on the device 100 since the optical elements 12 are exposed at the frame 102 through of device 100 and the frame 102 of the device 10 provides a portion of the mating surface for engaging a complimentary mating optical plug. The frame of the device exposes respective optical elements 12 at optical element openings 104, whose sizes are exaggerated so they are visible in the drawings. By way of non-limiting example, the optical elements 12 may have a diameter of about 400 microns, but other suitable sizes are possible for the optical elements as desired.

Stated another way, a majority of a mating area of an optical interface area OIA (FIG. 5) is provided by the frame of the device (i.e. a ratio of frame mating area to OIA). For instance, one embodiment may have 80% or more of the OIA provided by the frame of the device, another embodiment may have 90% or more of the OIA provided by the frame of the device, and still another embodiment may have 95% or more of the OIA provided by the frame of the device. As used herein, "optical interface area" OIA is the mating area formed between the optical port and complimentary plug that is measured between the alignment features of the optical port and complimentary mating plug as depicted in FIG. 5 by the dashed outline. As a non-limiting example of the OIA calculation, the OIA may have a mating area with a height H dimension of about 4 millimeters and a width W between alignment features of about 4 millimeters for an OIA of 16 square millimeters and each optical element opening 104 of the frame is round with a diameter of about 400 microns (0.400 millimeters) so that each individual optical element opening has an area of about 0.125 square millimeters times, thereby yielding a total optical element opening area of about 0.50 square millimeters for the four optical element openings. In this non-limiting example, the mating area provided by the frame of the device is about 15.50 square millimeters of the 16 square millimeters of OIA (and 0.50 square millimeters of mating area is provided by the optical elements) for a ratio of about 96% of the OIA being provided by the frame of the device.

Figure 6:
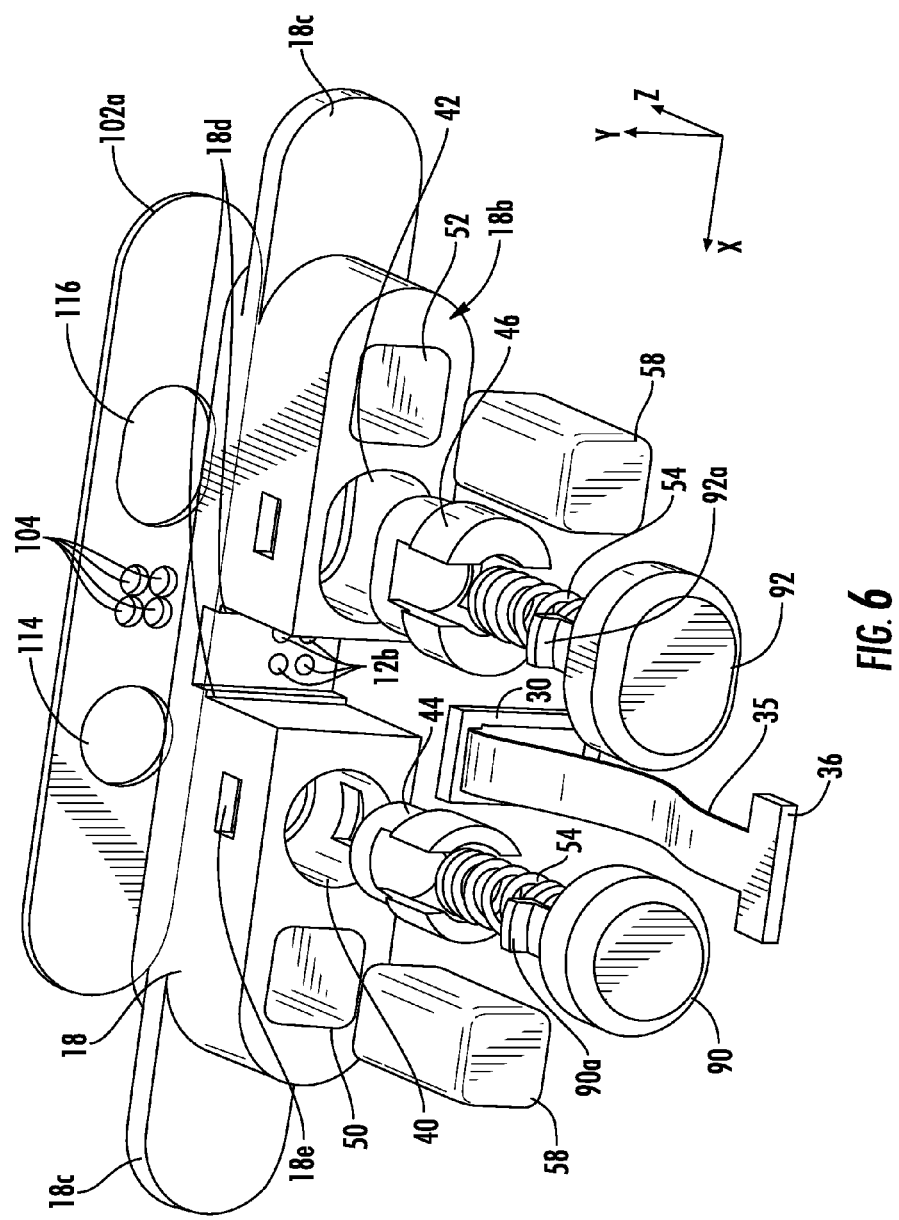
FIG. 6 is a rear exploded view of the optical port of FIG. 4.
Figure 7:
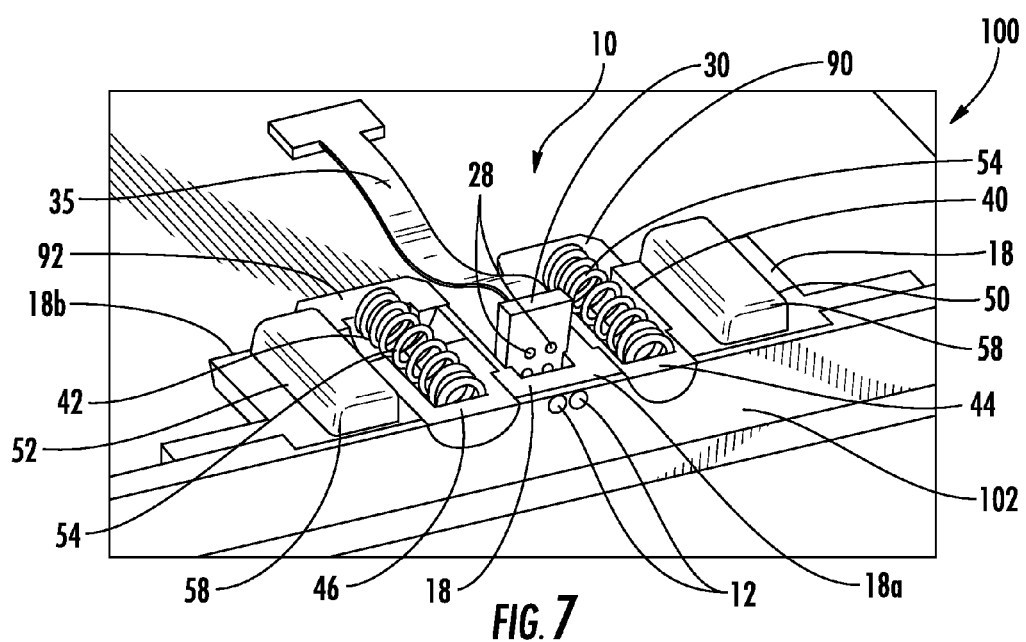
FIG. 7 is a cutaway assembled perspective view showing the details of the optical port of FIG. 1.

FIGS. 5 and 6 are respective front and rear exploded views of the optical port 10 showing details of this particular construction. The mounting body can have any suitable configuration and may be tailored to fit the specific device that the optical port 10 is disposed within. The explanatory mounting body 18 shown will be discussed in more detail below, but other arrangements or configurations are possible according to the concepts disclosed herein. In this embodiment, mounting body 18 includes one or more optical elements 12 that are a portion of the mounting body 18 with respective front surfaces 12a that extend beyond a mounting surface 19 at front side 18a. The optical elements 12 transmit optical signal through the mounting body 18 and include respective lenses 12b at a rear side 18b having a suitable lens prescription for transmitting/receiving signals from active devices 28 that may be disposed on circuit board 35 or alternatively disposed on a leadframe. Further, the lens prescriptions for the transit and receive channels may be different or the same as desired for providing the desired optical performance. Mounting surface 19 includes a perimeter stepped surface that generally conforms with the shape of opening 103 on a frame perimeter 102a, thereby locating the mounting body to frame 102 (FIG. 7). Flanges 18c are disposed on distal ends of mounting body 18 and act as a stop for the mounting body relative to frame 102. In this embodiment, mounting body includes ledges 18d at the rear side 18b for positioning the circuit board 30 at a suitable Z-distance from lenses 12b. Circuit board 30 may have an electrical tether 35 for transmitting electrical signals through and optional electrical connector 36 or have leads for soldering as desired.

As shown, mounting body 18 may also optionally include one or more pockets such as pockets 40,42 or pockets 50,52. The one or more pockets 40 may be used for attaching and/or receiving the desired components or structure of the optical port. By way of explanation, the one or more pockets can include an alignment feature such as a piston or a retention feature such as magnet disposed in the pocket or cavity as desired for the given optical port. As shown, optical port 10 includes a first piston assembly (not numbered) that is received in by a first pocket 40 and a second piston assembly (not numbered) that is received by a second pocket 42 as discussed in more detail below. The first and second pockets 40,42 are located outboard of the optical elements 12 and OIA and are exposed to the front side 18a of mounting body 18. Consequently, respective pistons 44,46 are exposed at the device so they can translate within the respective pockets and provide alignment to a complimentary mating optical plug. Other embodiments of optical ports can use other alignment features such as bores (e.g. no pistons) or pins formed in the mounting body; however, bores may collect dirt and debris and pins do not allow a sleek and flush surface, which may not be attractive/desirable to the end user since they can allow damage or inhibit large number of mating cycles. Allowing the pistons to translate to a generally flush position provides a sleek look and design for the optical port/device and inhibits dirt and debris from inhibiting a large number mating cycles and/or damage.

Figure 8:
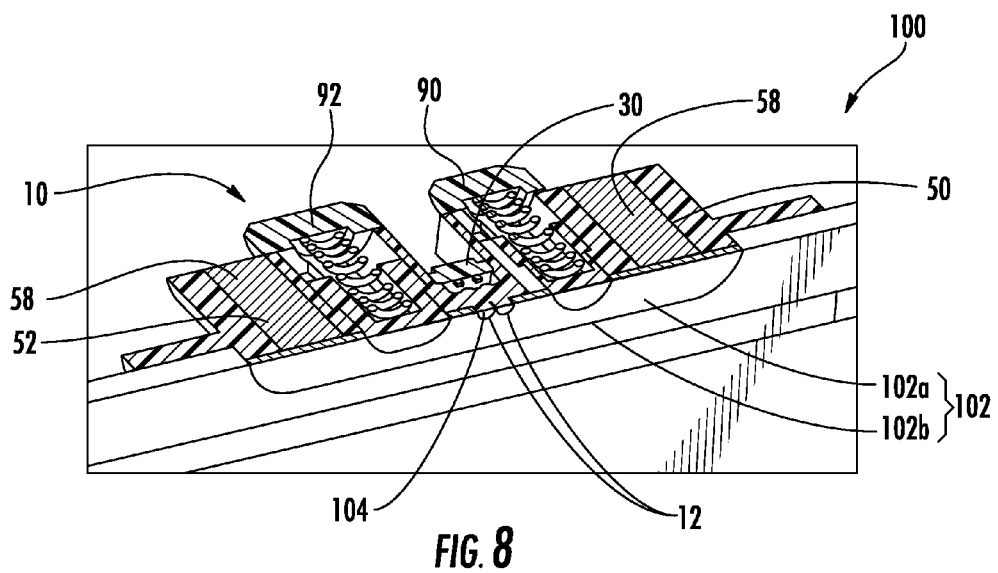
FIGS. 8 and 9 are cutaway line drawings respectively depicting details of the optical port of FIG. 1.
Figure 9:
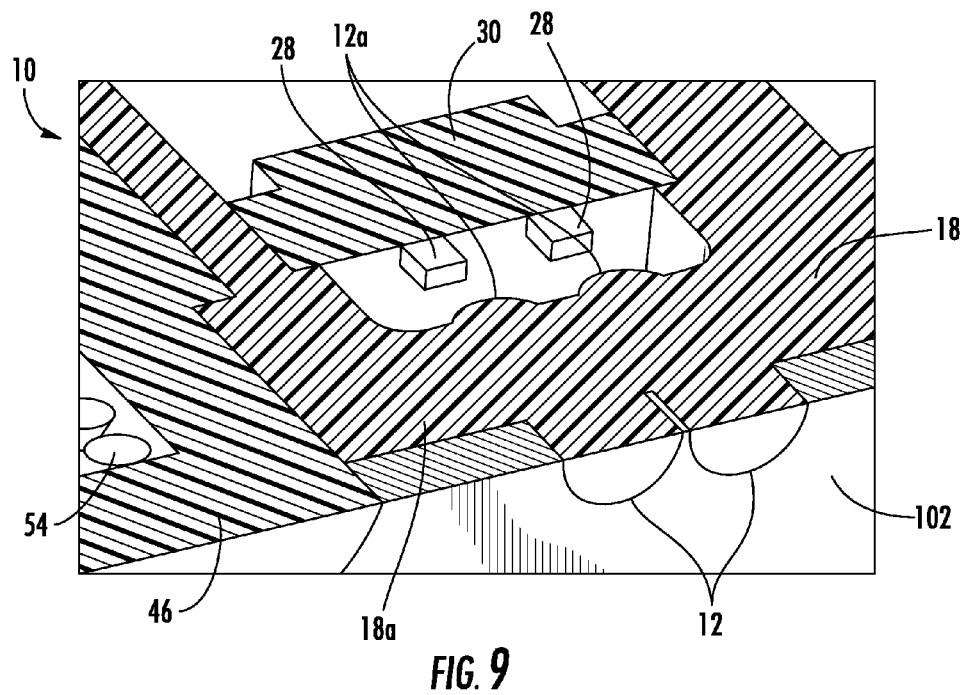

FIG. 7 is a cutaway assembled perspective view showing the details of the optical port 10 disposed in device 100 and FIGS. 8 and 9 are cutaway line drawings showing details of the assembled optical port 10. As discussed, optical port 10 includes mounting body 18 and one or more optical elements 12 for communicating an optical signal(s) to an optical cable assembly (FIGS. 10-12) or the like that is mated to the optical port 10. Mounting body 18 is disposed in frame 102 of device 100 so that the one or more optical elements 12 are exposed at the one or more optical element openings 104 of frame 102 for providing a minimalist footprint. The optical elements 12 may have front surfaces 12*a* that extend beyond mounting surface 19 of the mounting body 18 and extend into the frame wall (not numbered) or be flush with the inside surface of the frame wall as desired. In this embodiment, optical elements 12 are integrally formed with mounting body 18 so that the one or more optical elements 12 are a portion of the mounting body 18. If the optical elements 12 are a portion of the mounting body 18, then mounting body 18 should be formed of suitable optically transparent material such as an ULTEM material for the transmission of optical signals at the desired wavelengths. Generally speaking, integrally forming the optical elements 12 with the mounting body 18 reduces the part count of the optical port.

As depicted in FIG. 7, optical port 10 further includes one or more active devices 28 such as photodiodes or VCSELs for receiving or transmitting optical signals to respective optical elements 12. The one or more optical elements 12 are respectively aligned with one or more active devices 28 of the optical port 10 for providing a suitable optical input or output. The active devices 28 are aligned in the X, Y and Z axes to the optical elements 12 using a passive alignment (e.g., structure such as ledges, pins and/or bores) and/or active alignment (e.g., active vision alignment) so that a suitable optical signal is either received or transmitted for optical communication. For the purposes of clarity, the longitudinal axes of the optical elements are aligned in the X and Y-directions with the active components and offset at a suitable distance in the Z-direction. As shown, the one or more active devices 28 are disposed on a circuit board 30 that is attached to the mounting body using a suitable method. For instance, the circuit board may be attached using an adhesive, UV curable, or other material or the like to inhibit relative movement between active components and the optical elements. Preferably, the attachment between the circuit board 30 and the mounting body 18 is robust to inhibit movement during rough handling such as impact or shock such as experience when dropping the device or the like. Moreover, the cavity between the active components and the optical elements may be closed off or sealed using structure and/or optically transparent materials or the like for inhibiting dust or debris from interfering with signal transmission and further fixing the relative positions therebetween. As discussed above, the circuit board 30 may further include an electrical tether 35 for electrically attaching the active components to a motherboard or the like. However, other configurations for transferring the electrical signals are possible depending the structure of the circuit board and/or device and mounting location of the optical port. By way of example, the active devices may be a portion of a lead frame that is secured to the mounting body or the circuit board can attach directly to a board connector, but this may make alignment more difficult.

With continuing reference to FIG. 7, the mounting body 18 may include the pocket 40 with an alignment feature 14 disposed in the pocket, where the alignment feature is a first piston 44 as best shown in FIGS. 5 and 6 that is translatable during mating. Specifically with respect to the explanatory embodiment, mounting body 18 includes a first pocket 40 and a second pocket 42 (i.e., a first group of pockets) disposed on opposite sides of the one or more optical elements 12 with a first alignment feature 14 disposed in the first pocket 40 and a second alignment feature 16 disposed in the second pocket 42. More specifically, the mounting body 18 of optical port 10 has the first and second alignment features 14, 16 that are configured as respective first piston 44 and second piston 46, which are translatable during mating for receiving respective alignment features of a complimentary plug such as alignment pins or the like.

Alignment features may be normally biased to a forward and/or flush position with the frame of the device as desired. By way of example, a suitable resilient member may bias the alignment features forward when the optical port is not mated with a plug, thereby keeping dirt and debris out of the respective pocket or the device. As shown by FIG. 7, the first piston 44 is biased forward by a first resilient member 54 and the second piston 46 is biased forward by a second resilient member 54. As shown, resilient members 54 are coil springs, but any suitable resilient members are possible. Furthermore, the alignment members such as the pistons can have any suitable shape as desired, which may be the same or different shapes. By way of example, the first piston 44 has a first cross-sectional shape (e.g., round) and the second piston 46 has a second cross-sectional shape (e.g. oval) so that the first cross-sectional shape is different than the second cross-sectional shape and provides keying for the optical port 10. Stated another way, the different cross-section shapes for the alignment feature may allow only one mating orientation with the plug and provides polarity for the transmit and receive channels or alternatively may allow for free-floating along one axis for a second alignment feature of the plug assembly as discussed below. Consequently, pockets 40 and 42 of mounting body 18 have different cross-sectional shapes for receiving the different cross-sectional shapes of pistons 44, 46.

As best shown in FIGS. 5 and 6, pistons 44, 46 have respective stepped shafts 44*a*, 44*b* that acts as a stop for limiting the travel of the pistons in respective pockets 40, 46. Likewise, pockets 40, 46 have a stepped bore (not numbered) that cooperates with the stepped shaft surface of the pistons 44, 46 for limiting the travel of the pistons. For instance, the locations of the stepped surfaces are selected to allow the pistons to be generally flush with the frame of the device when unmated for providing a "clean" looking appearance of the optical port on the device and keep dirt and debris from entering the device. In other embodiments the alignment features/pistons may extend from the frame or be recessed from the frame as desired. Since the pistons and pockets of optical port 10 have stepped profiles the pistons must be inserted into the respective pockets from the rear side 18b of mounting body 18 during manufacture followed by the respective resilient members. Consequently, optical port 10 includes one or more caps 90,92a attached to the rear side 18b of mounting body 18 at the back of pockets 40, 42 for trapping and securing the pistons 44, 46 and resilient members 54 in the respective pockets 40, 42. Moreover, the caps 90 also act as spring pushes to compress the resilient members 54 in the pocket to create a suitable forward biasing force on the alignment members/pistons. As shown, caps 90, 92 include respective arms and locking features 90a, 92a on opposite sides for engaging a plurality of respective windows 18e on mounting body 18, but other methods for attaching caps are possible. Pistons 44, 46 are also shown as having cantilever arms (not numbered) and extending rearward so to reduce the contact surface area and friction with the pockets 40, 42, but other variations are possible.

In other embodiments, the alignment features/pistons may have the same cross-sectional shapes. This potentially allows the plug to be mated in either orientation, thereby creating a palindromic configuration for the plug and optical port (i.e., the mating can occur in either orientation and still properly transmit traffic between the optical port and plug). However, the alignment features can still have different shapes and allow palindromic configuration by using suitable alignment features on the plug as discussed herein.

As shown, mounting body 18 also includes further optional pockets for receiving an attachment feature therein. In this embodiment, the further optional pockets are a second group of pockets, namely, pockets 50, 52 disposed outboard from the first group of pockets 40, 42. Pockets 50, 52 are used for housing and securing attachment features configured as magnets 58 disposed therein; however, other suitable attachment features are possible using the concepts disclosed herein. As shown, magnets 58 are disposed in the mounting body 18, but behind the frame 102 so that any magnetic debris that is attracted to the magnets does not invade the device, but instead can be wiped away from the frame 102. As shown, the frame faceplate 102a has a reduced wall thickness adjacent to the magnets 58 (and relative to frame perimeter 102a) for decreasing the distance of magnetic attraction and increasing the magnetic force for complementary plug attraction. Although pockets 50, 52 of mounting body 18 are shown with open ends at the rear side 18b (FIGS. 5 and 6), one or more ends of the pockets may be closed or the magnets may be encapsulated in the mounting body as desired. In this embodiment, the magnets 58 can have a friction fit with the mounting body and/or use an adhesive for attaching the magnet in mounting body 18. In still other embodiments, the attachment/retention features may be separate from the optical port such as attached directly to the frame or the like.

FIG. 10 is a perspective view showing the mating portion of an explanatory optical cable assembly 200 having a complimentary optical plug 220 attached to an optical fiber cable 210 for mating with optical port 10. Optical plug 220 includes a first alignment feature 214 and a second alignment feature 216 configured as alignment pins disposed on opposite sides of optical plug optical elements 212. Optical plug optical elements 212 have a suitable spacing and arrangement for aligning with the optical elements 12 of optical port 10 when mated for transmitting optical signals. In this embodiment, optical plug 220 has alignment features 214,216 with the same cross-sectional size and shape (e.g. round) that extend from the optical plug mating surface (not numbered). In this embodiment, the alignment features are integrally formed with an optical plug body 218; however, the alignment feature may be discrete components if desired. Optical plug body 218 is preferably formed from a suitable optically transmissive material such as a suitable Ultem® material that has optical elements 212 integrally formed therein, but other configurations are possible.

Even though the alignment features have the same round shape, the optical plug 220 still mates with optical port 10 using the round and oval shaped translatable pistons (e.g. circle and oval slot arrangement) since alignment feature 214 provides positional alignment (e.g., round to round mating) and alignment feature 216 provides rotational alignment (e.g., round to oval slot mating). Thus, a high-precision molded part is not required for alignment of the optical elements since alignment feature 216 has a lateral tolerance within the oval-shaped alignment feature of optical port 10. Moreover, using two round alignment features 214,216 for optical plug 220 allows palindromic mating if desired. Of course, optical plug 220 may use alignment features having two different cross-sectional shapes for keying the optical plug 220 to optical port 10 so that it only mates in one orientation; however, a higher-degree of precision may be required for the part.

Optical plug 220 also includes magnets 258 with the opposite polarity of the magnets in the optical port 10 for retention during mating. Additionally, magnets 258 are recessed from the mating surface of the plug so that ferrous debris may be easily be removed or cleaned from the optical plug mating surface. Optical plug 220 also has a complementary optical interface area OIA as shown by the dashed line with a width W1 and a height H1 for mating with the frame and optical elements of device 100. Consequently, a majority of the OIA mates with the frame of the device, thereby causing the softer mating surface of the optical plug 220 to wear first instead of the frame of the device. This allows wearing and replacement of the optical plug instead of the more expensive device. FIGS. 11 and 12 are perspective views showing the alignment and mating of the cable assembly 220 with the optical port 10 on device 100.

Figure 13:
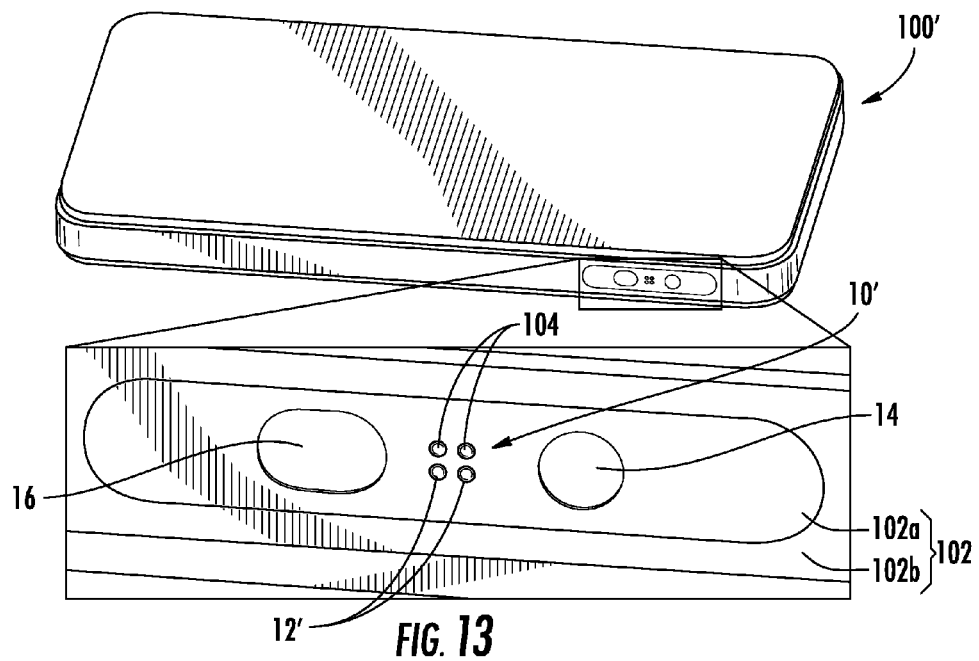
FIG. 13 is a perspective view of another device having an alternate optical port that uses another type of optical element according to the concepts disclosed herein

Although, optical port 10 has one or more optical elements 12 being a portion of the mounting body 18, other configurations for the optical elements of the optical port are possible. For instance, the optical elements may configured as discrete lenses such as individual glass rods or GRIN lens that are attached to the mounting body. By way of example, FIG. 13 is a perspective view of another device 100' having an optical port 10' that is similar to optical port 10, but uses discrete lenses as optical elements 12' secured to mounting body 18'. Optical elements 12' are located in respective bores 15 of a mounting body 18' (FIGS. 15 and 16) and may include a support structure 13 for supporting and allowing the front surfaces 12a' of optical elements 12' to extend beyond mounting surface 19 as discussed in more detail below. Since mounting body 18' does not have the optical elements integrally formed therein the material used is not required to be optically transmissive like the mounting body 18 of optical port 10.

Figure 14:
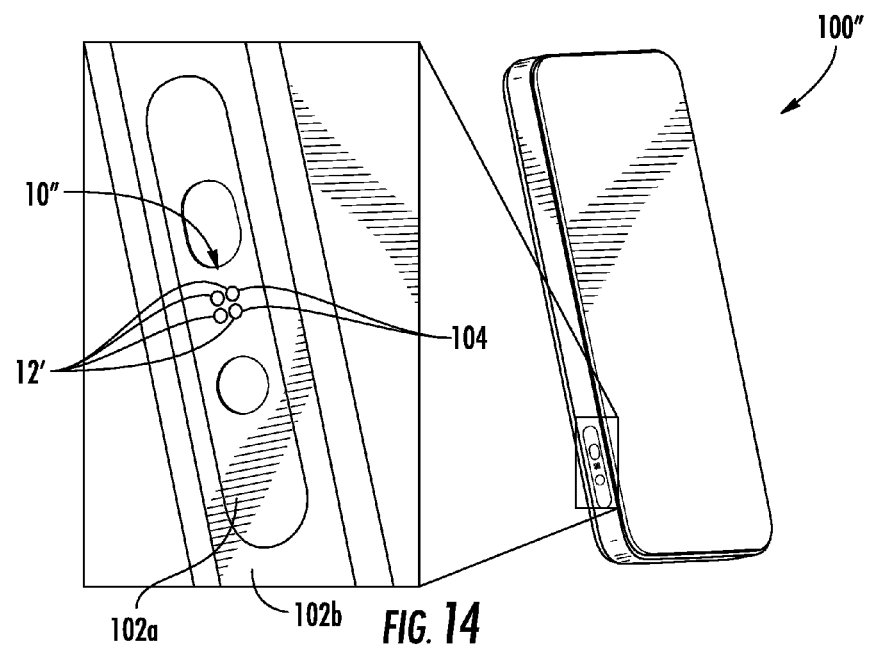
FIG. 14 is a perspective view of a device similar to the device of FIG. 7 where the structure for holding the optical elements of the optical port has a contrasting color so the user can identify the optical port on the frame of the device.

By way of example, FIG. 14 is a perspective view of a device 100" similar to the device of FIG. 13 where the mounting body 18' has a contrasting color such as black or dark grey (e.g., not optical transmissive) so the user can easily identify the position of the optical port 10' on the frame 102 of device 100. Consequently, the contrasting color of a support structure 13 having a contrasting color is visible so the user can easily identify the position of the optical port 10' on the frame 102 of device 100".

Figure 15:
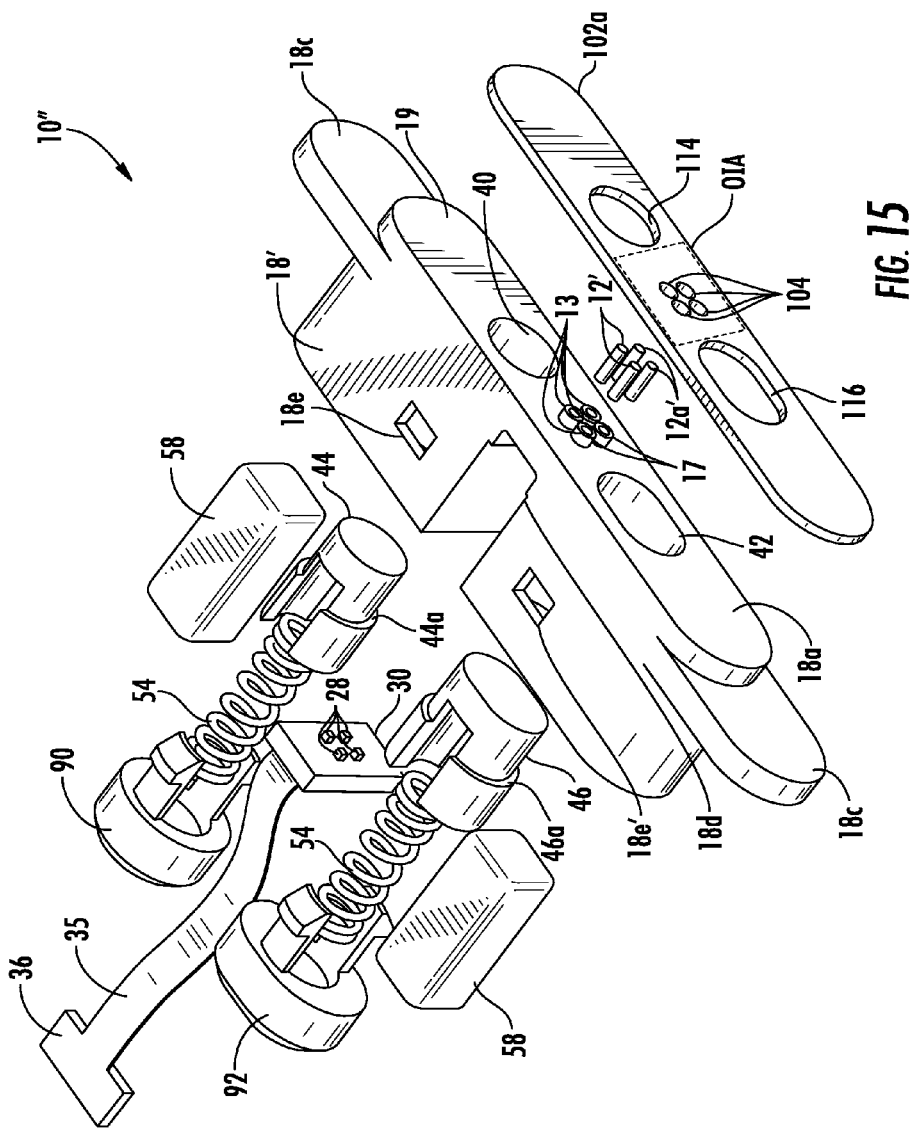
FIG. 15 is a front exploded view of the optical port disposed on the device of FIG. 14.
Figure 16:
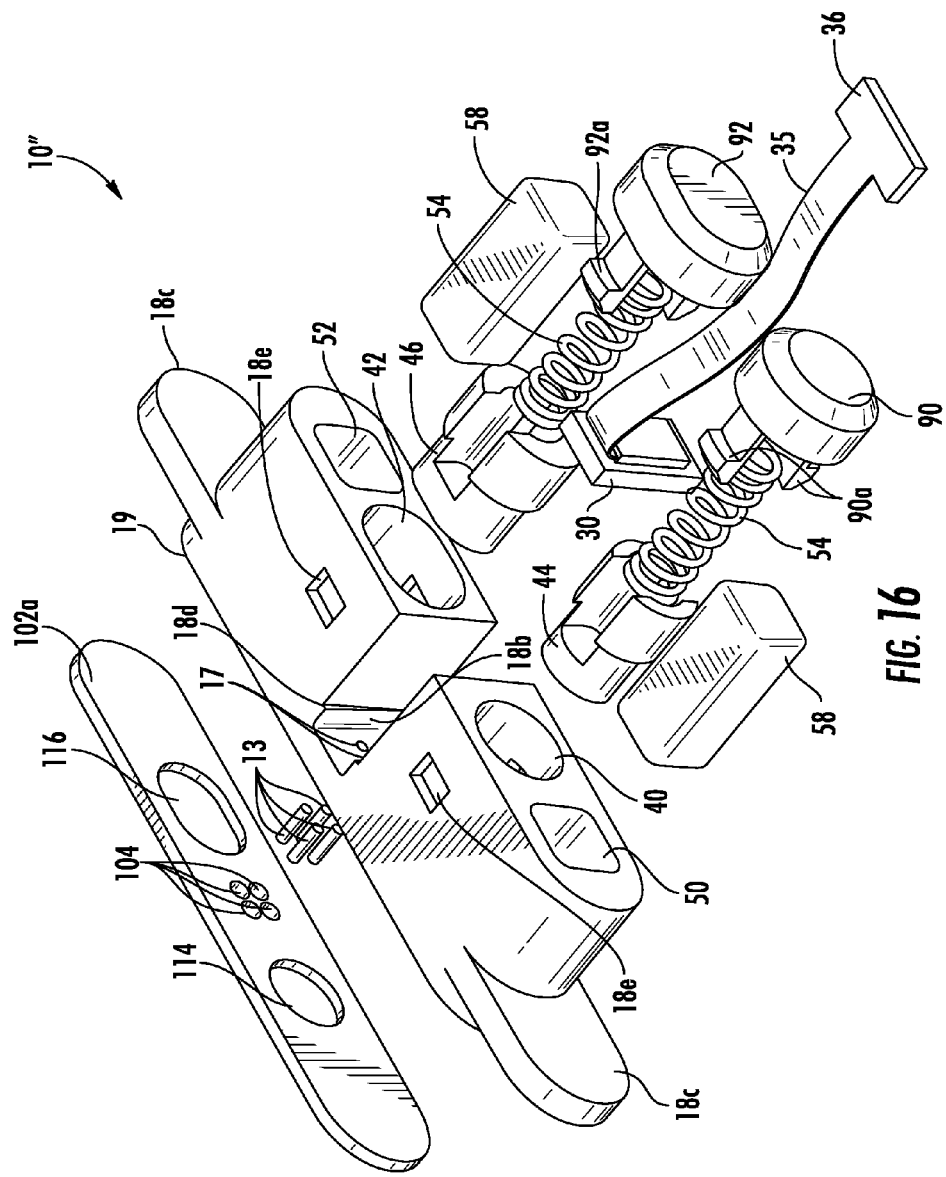
FIG. 16 is a rear exploded view of the optical port disposed on the device of FIG. 14.
Figure 20:
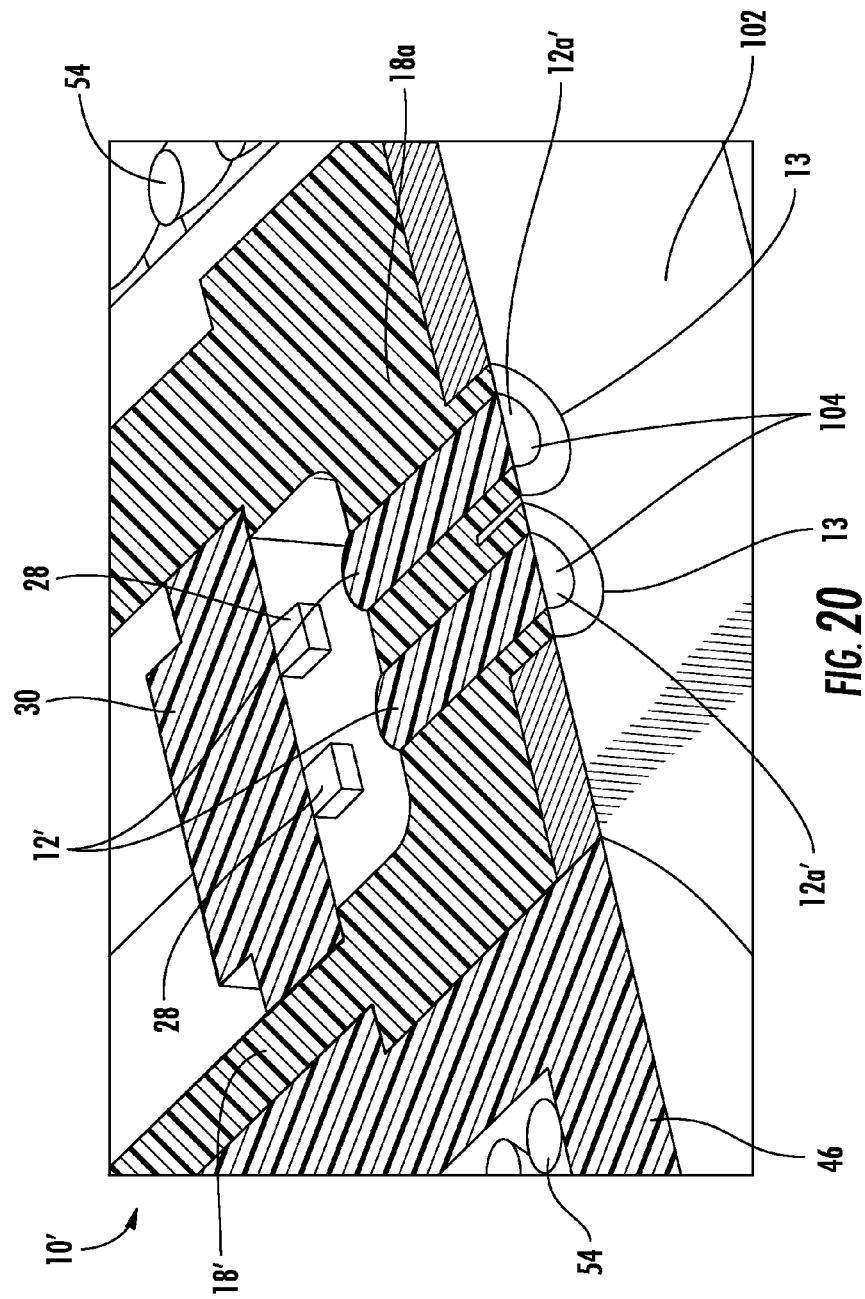
FIG. 20 is a cutaway detail line drawing showing the alignment of the optical elements with the active components of the optical port of FIGS. 13 and 14.

Further details and description is shown by FIGS. 15 and 16, which respectively are front and rear exploded views of optical port 10″ which is similar to the optical port 10, except that optical elements 12′ are configured as lenses secured to the mounting body 18′ within a plurality of respective bores 17. Bores 17 extend from the front side 18a to the rear side 18b of mounting body 18′ for transmitting optical signals therethrough within the optical elements 12′. Consequently, mounting body 18′ does not have to be optical transmissive to the desired wavelengths so the use of many different materials and/or colors for the materials are possible. As shown, optical elements 12′ are lenses having a suitable length for being received in bores 17 so that front faces 12a′ extend from the mounting surface 19 of mounting body 18′ and the front portion of the optical elements 12′ are protected by support structure 13 as best shown in FIG. 20.

Figure 17:
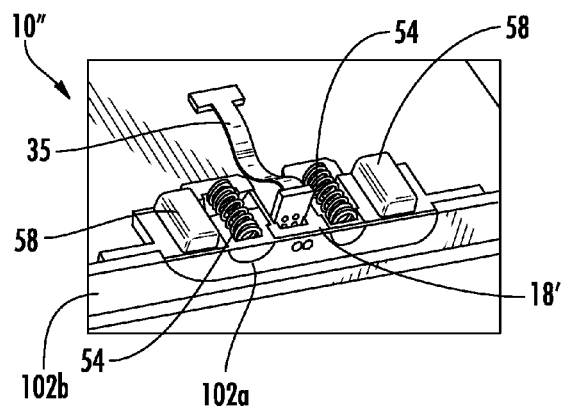
FIGS. 17 and 18 shows cutaway views illustrating the details of the optical port of FIG. 14 when the alignment features are respectively positioned in an unmated and a mated configuration (i.e., the alignment features are being depressed as if a complementary plug is attached to the optical port)
Figure 18:
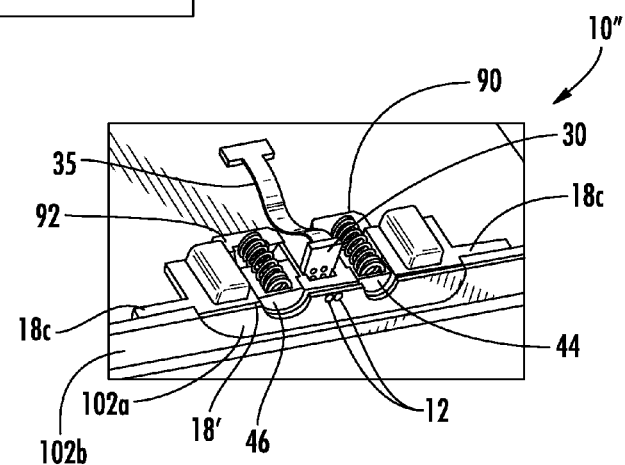
Figure 19:
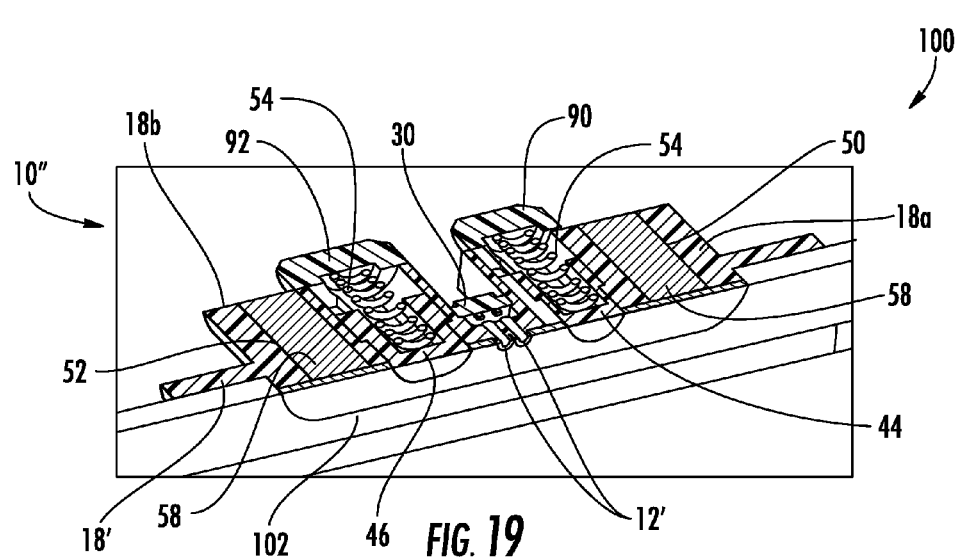
FIG. 19 is a cutaway line drawing showing details of the optical port of FIGS. 13 and 14.

Similar to previous figures of optical port 10, FIGS. 17 and 18 are cutaway views illustrating the assembled details of optical port 10″ with the alignment features respectively positioned in unmated and a mated configurations such as discussed above with respect to optical port 10. FIGS. 19 and 20 are cutaway line drawings showing details of the optical port 10″ and an assembled detail view of optical elements 12′ secured in mounting body 18′. As shown, support structure 13 and front faces 12a′ are generally flush with frame 102 so that debris and dirt does not accumulate in recesses. Since the optical element openings 104 need to accommodate support structure 13 the optical element openings 104 may be larger than used for the optical port 10, but the optical ports 10′, 10″ still provide a minimalist footprint according to the concepts disclosed herein.

Figure 21:
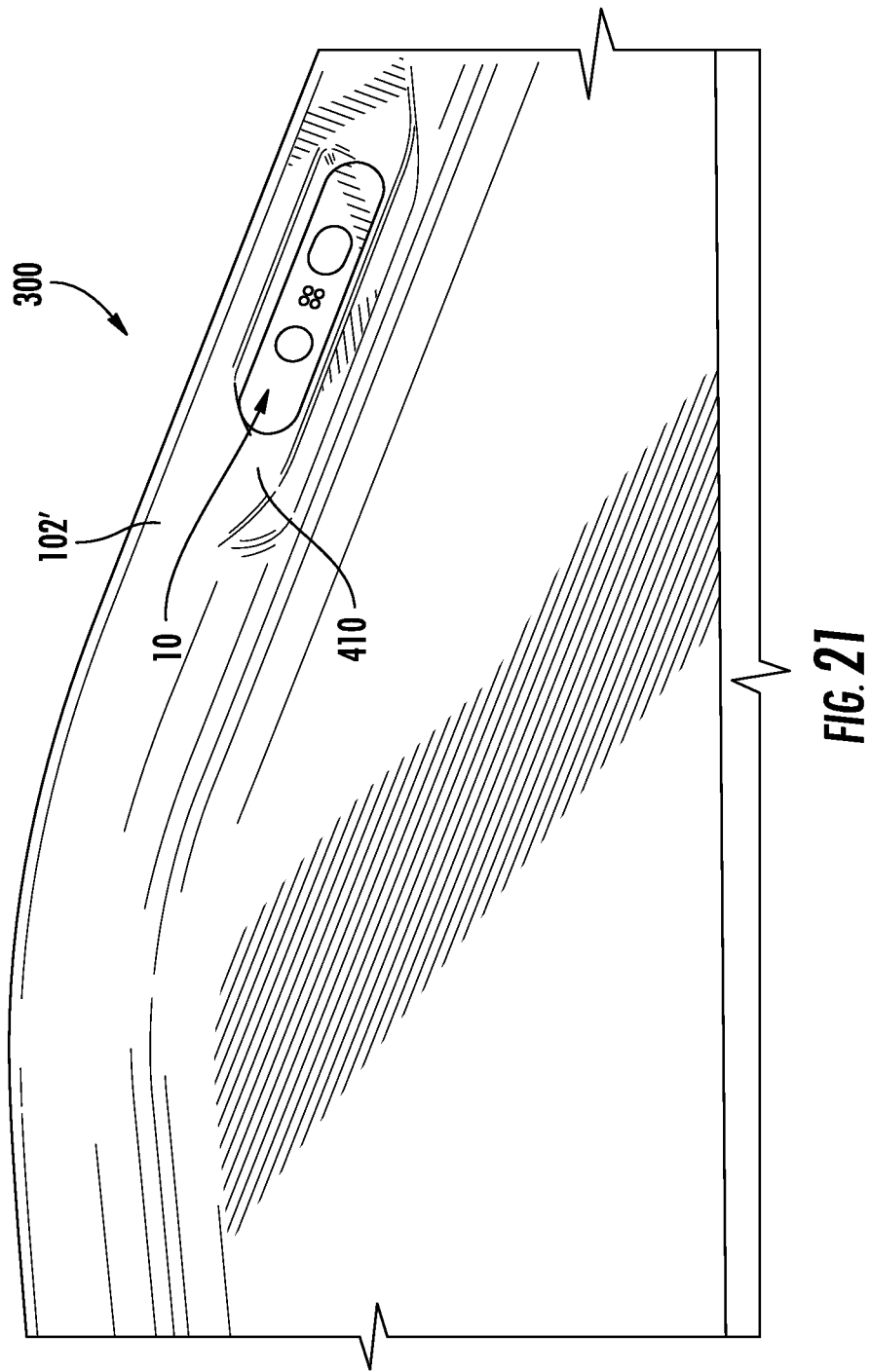
FIGS. 21-23 depict optical ports disposed on alternative frame configurations according to the concepts disclosed herein.
Figure 22:
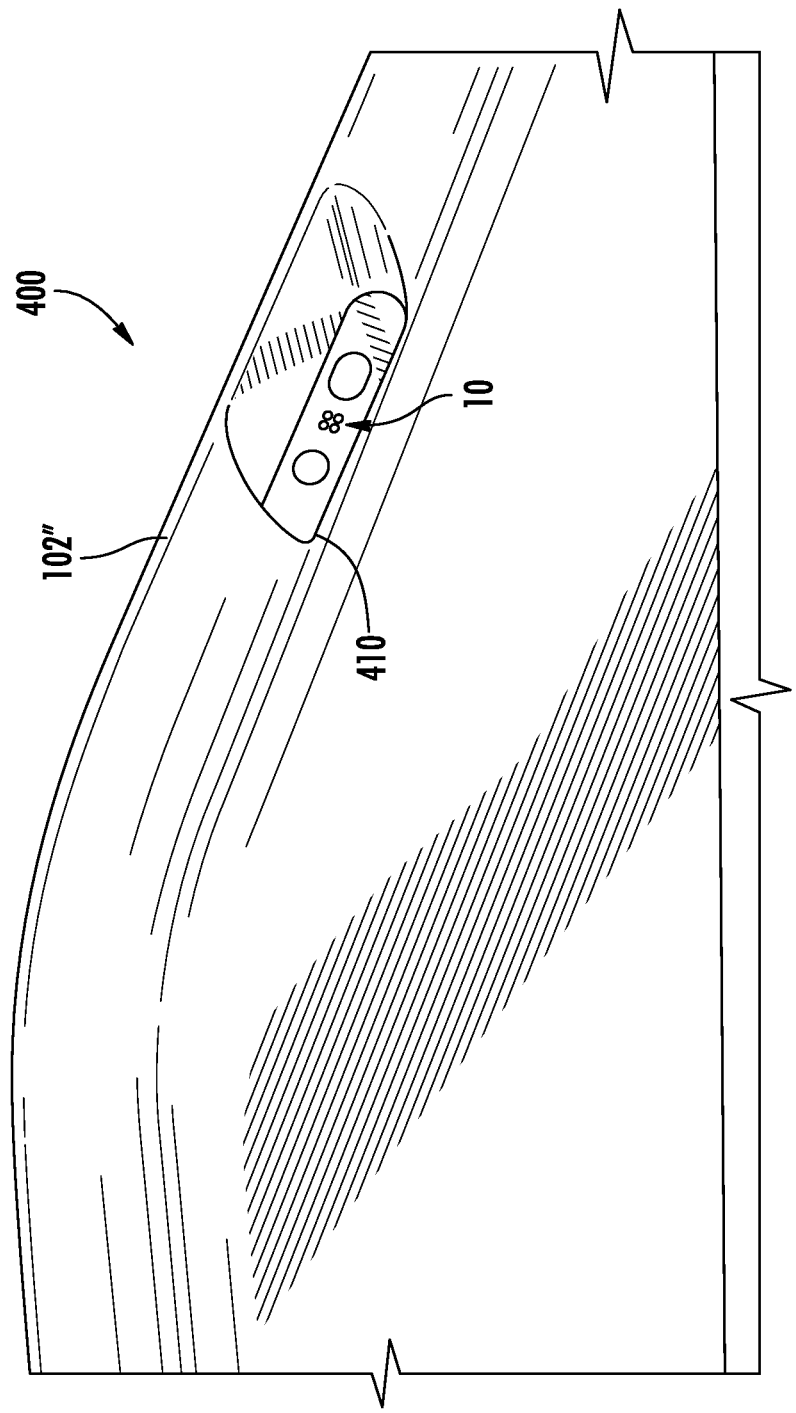
Figure 23:
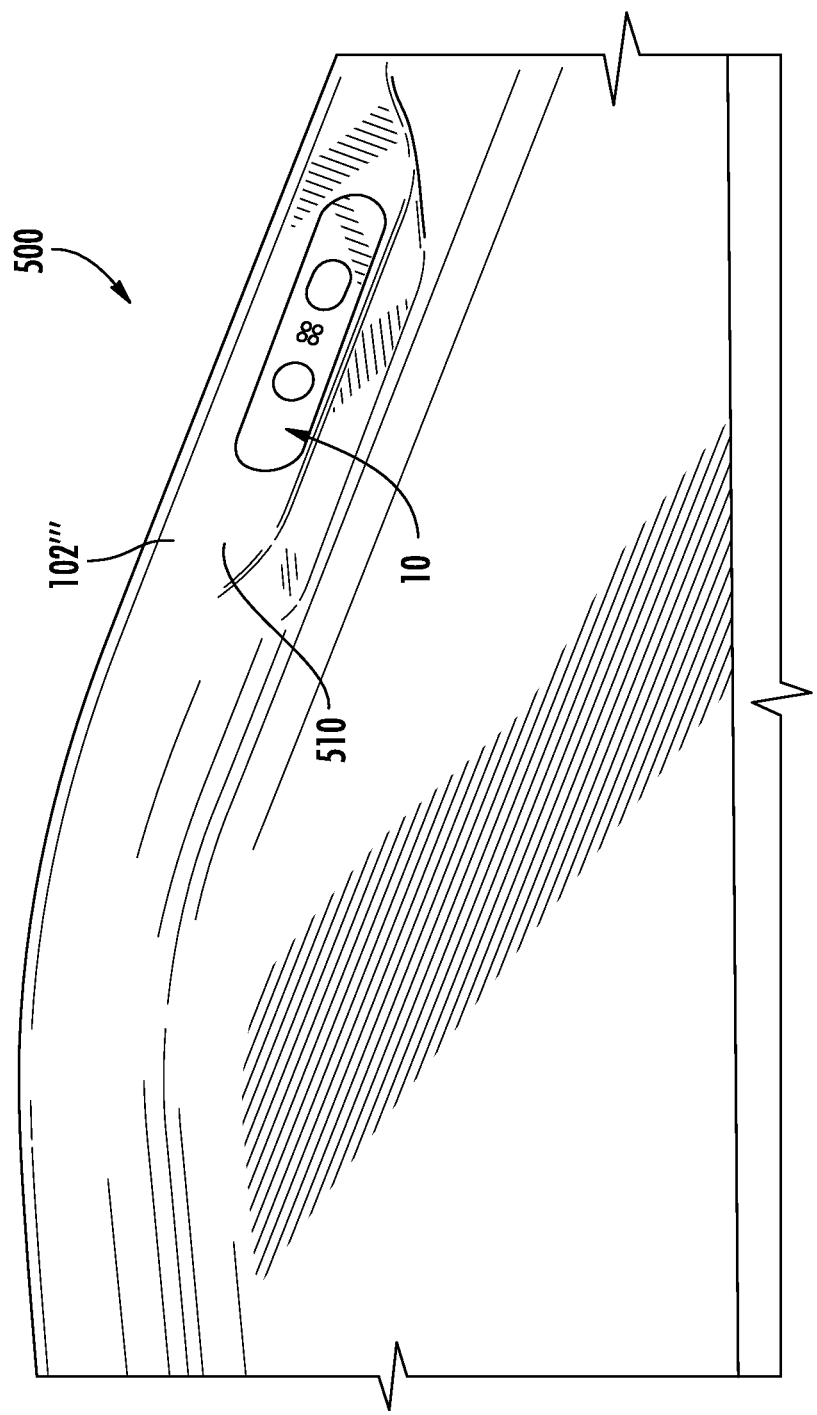

Although, the optical ports were described and illustrated with respect to device 100 and its frame, other suitable devices and/or configurations are possible with the optical ports disclosed herein. By way of example, FIGS. 21-23 depict optical ports according to the concepts disclosed herein disposed within alternative frame configurations of devices such as a tablets or the other suitable devices. Specifically, FIG. 21 depicts frame 102′ of device 300 having optical port 10 disposed on a blister 310 that partially projects from the frame 102′ and is partially shield by an overhang (not numbered) of frame 102′. FIG. 22 depicts frame 102″ of device 400 having optical port 10 disposed on a blister 410 that is recessed from into frame 102′ and is shielded by an overhang (not numbered) of frame 102″. FIG. 23 depicts frame 102′″ of device 500 having optical port 10 disposed on a blister 510 that extends from into frame 102′″. Of course, other variations are possible according to the concepts disclosed herein.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A device having an optical port, comprising:
    a frame having one or more optical element openings;
    the optical port having a mounting body and one or more optical elements for communicating an optical signal, wherein the mounting body is disposed inside the frame so that each of the one or more optical elements is exposed at the one or more optical element openings of the frame, thereby providing a device with a minimalist optical port footprint so that a complimentary mating optical plug engages a portion of the frame during mating.

2. The device of claim 1, wherein the optical port has an optical interface area, wherein 80% or more of the optical interface area is provided by the frame of the device.

3. The device of claim 1, the optical port further including one or more alignment features and the frame further including one or more alignment feature openings for receiving the one or more alignment features.

4. The device of claim 1, the one or more optical elements being a portion of the mounting body or being discrete lenses attached to the mounting body.

5. The device of claim 1, the optical port further including one or more active devices, wherein the one or more optical elements are aligned with one or more active devices of the optical port.

6. The device of claim 5, the one or more active devices being disposed on a circuit board that is attached to the mounting body.

7. The device of claim 6, wherein the circuit board further includes an electrical tether.

8. The device of claim 1, the mounting body further including one or more pockets.

9. The device of claim 1, the mounting body further including a pocket with an alignment feature or a magnet disposed in the pocket.

10. The device of claim 1, the mounting body further including a pocket with an alignment feature disposed in the pocket, wherein the alignment feature including a piston that is translatable during mating.

11. The device of claim 1, the mounting body further including a first pocket and a second pocket disposed on opposite sides of the one or more optical elements with a first alignment feature disposed in the first pocket and a second alignment feature disposed in the second pocket, wherein the first and second alignment features including a respective first piston and second piston that are translatable during mating.

12. The device of claim 11, wherein the first piston has a first cross-sectional shape and the second piston has a second cross-sectional shape, wherein the first cross-sectional shape is different than the second cross-sectional shape.

13. The device of claim 11, the first piston being biased forward by a first resilient member and the second piston being biased forward by a second resilient member.

14. A device having an optical port, comprising:
    a frame having one or more optical element openings;
    the optical port having a mounting body and one or more optical elements for communicating an optical signal, wherein the mounting body is disposed inside the frame so that each of the one or more optical elements is exposed at the one or more optical element openings of the frame, thereby providing a device with a minimalist optical port footprint so that a complimentary mating optical plug engages a portion of the frame during mating, wherein the optical port has an optical interface area, wherein 80% or more of the optical interface area is provided by the frame of the device.

15. The device of claim 14, the optical port further including one or more alignment features and the frame further including one or more alignment feature openings for receiving the one or more alignment features.

16. A device having an optical port, comprising:
    a frame having one or more optical element openings;

the optical port having a mounting body and one or more optical elements for communicating an optical signal, the mounting body further including a pocket with an alignment feature or a magnet disposed in the pocket, and wherein the mounting body is disposed inside the frame so that each of the one or more optical elements is exposed at the one or more optical element openings of the frame, thereby providing a device with a minimalist optical port footprint so that a complimentary mating optical plug engages a portion of the frame during mating.

17. The device of claim 16, wherein the optical port has an optical interface area, wherein 80% or more of the optical interface area is provided by the frame of the device.

18. The device of claim 16, the frame further including one or more alignment feature openings for receiving the one or more alignment features.

19. The device of claim 16, the one or more optical elements being a portion of the mounting body or being discrete lenses attached to the mounting body.

20. The device of claim 16, the optical port further including one or more active devices, wherein the one or more optical elements are aligned with one or more active devices of the optical port.

21. The device of claim 20, the one or more active devices being disposed on a circuit board that is attached to the mounting body.

22. The device of claim 21, wherein the circuit board further includes an electrical tether.

23. The device of claim 16, the mounting body further including a first pocket and a second pocket disposed on opposite sides of the one or more optical elements with a first alignment feature disposed in the first pocket and a second alignment feature disposed in the second pocket, wherein the first and second alignment features including a respective first piston and second piston that are translatable during mating.

24. The device of claim 23, wherein the first piston has a first cross-sectional shape and the second piston has a second cross-sectional shape, wherein the first cross-sectional shape is different than the second cross-sectional shape.

25. The device of claim 23, the first piston being biased forward by a first resilient member and the second piston being biased forward by a second resilient member.

* * * * *